United States Patent
Key

(10) Patent No.: US 11,530,945 B2
(45) Date of Patent: Dec. 20, 2022

(54) DIMENSIONAL MEASURING SYSTEM

(71) Applicant: United States Postal Service, Washington, DC (US)

(72) Inventor: Wanda L. Key, Gainesville, VA (US)

(73) Assignee: United States Postal Service, Washington, DC (US)

( * ) Notice: Subject to any disclaimer, the term of this patent is extended or adjusted under 35 U.S.C. 154(b) by 482 days.

(21) Appl. No.: 16/811,552

(22) Filed: Mar. 6, 2020

(65) Prior Publication Data

US 2020/0200589 A1 Jun. 25, 2020

Related U.S. Application Data

(63) Continuation of application No. 16/266,904, filed on Feb. 4, 2019, now Pat. No. 10,584,996, which is a continuation of application No. 15/178,040, filed on Jun. 9, 2016, now Pat. No. 10,197,433.

(60) Provisional application No. 62/175,769, filed on Jun. 15, 2015.

(51) Int. Cl.
*G01G 19/52* (2006.01)
*G01B 11/02* (2006.01)
*G01B 5/00* (2006.01)

(52) U.S. Cl.
CPC .............. *G01G 19/52* (2013.01); *G01B 5/00* (2013.01); *G01B 11/02* (2013.01)

(58) Field of Classification Search
CPC .................................. G01G 19/52; G01B 5/00
See application file for complete search history.

(56) References Cited

U.S. PATENT DOCUMENTS

| 5,331,118 | A | | 7/1994 | Jensen | |
|---|---|---|---|---|---|
| 5,528,517 | A | * | 6/1996 | Loken | G01D 21/00 33/1 V |
| 5,841,541 | A | | 11/1998 | Dlugos | |
| 5,878,379 | A | * | 3/1999 | Dlugos | G01G 19/005 702/159 |
| 6,286,656 | B1 | * | 9/2001 | Huang | B65G 47/90 198/418.9 |
| 6,427,354 | B1 | | 8/2002 | Vepsäläinen | |
| 2009/0323084 | A1 | | 12/2009 | Dunn et al. | |

(Continued)

FOREIGN PATENT DOCUMENTS

| EP | 2662659 | A1 | * | 11/2013 | ............. G01B 11/00 |
|---|---|---|---|---|---|
| EP | 2662659 | A1 | | 11/2013 | |

OTHER PUBLICATIONS

International Search Report and Written Opinion dated Oct. 20, 2016 in International Application No. PCT/US2016/036730.

(Continued)

*Primary Examiner* — Nathaniel T Woodward
(74) *Attorney, Agent, or Firm* — Knobbe Martens Olson & Bear LLP

(57) ABSTRACT

A multi-dimensional measuring system is disclosed. The measuring system includes a dimensional measuring device that fits over an exterior portion of an item and provides reference measurements in three orthogonal directions. The measuring system also includes a camera to take an image of the item with the dimensional measuring placed thereon and a hardware processor that receives and processes the image to determine the dimensions of the item based upon the reference measurements of the dimensional measuring device.

20 Claims, 7 Drawing Sheets

(56) References Cited

U.S. PATENT DOCUMENTS

2013/0000252 A1\* 1/2013 Pettersson ............... B65B 5/024
 348/46
2014/0125800 A1 5/2014 Van Nest et al.
2015/0042791 A1\* 2/2015 Metois ................. G01B 11/028
 348/135

OTHER PUBLICATIONS

International Preliminary Report on Patentability dated Jul. 21, 2017 in International Application No. PCT/US2016/036730.

\* cited by examiner

DIMENSIONAL MEASURING SYSTEM

INCORPORATION BY REFERENCE TO PRIORITY APPLICATIONS

This application claims priority to U.S. patent application Ser. No. 16/266,904, filed Feb. 4, 2019, which in turn claims priority to U.S. patent application Ser. No. 15/178,040, filed Jun. 9, 2016, now U.S. Pat. No. 10,197,433, which in turn claims the benefit of priority to Provisional Application 62/175,769, filed Jun. 15, 2015, which is incorporated by reference herein in its entirety. Any and all applications for which a foreign or domestic priority claim is identified in the Application Data Sheet as filed with the present application are hereby incorporated by reference under 37 CFR 1.57.

BACKGROUND

Field

This disclosure relates to devices, systems, and methods for providing three-dimensional measurements of items.

Description

It is often useful to know the size of items. For example, it may be useful to know the size of items to be shipped in a distribution network. To obtain a three-dimensional measurement of an object a user must typically use a tape measure, ruler, or similar device to measure each dimension independently. This conventional measuring process may be time consuming and error prone.

SUMMARY

The systems, methods, and devices of this disclosure each have several aspects, no single one of which is solely responsible for its desirable attributes. Without limiting the scope of this disclosure, its more prominent features will now be discussed briefly.

In one aspect, a measuring device includes a first side comprising an inner surface, a second side comprising an inner surface, the second side connected to the first side so that the inner surface of the second side is orthogonal to the inner surface of the first side, a third side comprising an inner surface, the third side connected to the first and second sides so that the inner surface of the third side is orthogonal to the inner surfaces of the first and second sides, and an interior corner formed at the intersection of the inner surfaces of the first, second, and third sides. In some aspects, the first, second, and third sides and corresponding inner surfaces are planar.

In some embodiments of the measuring device, a portion of each of the first and second sides form an arm extending in an x-direction, a portion of each of the first and third sides form an arm extending in a y-direction, and a portion of the second and third sides form an arm extending in a z-direction, and wherein the x-, y-, and z-directions are each orthogonally oriented with respect to each other. In some embodiments, each of the arms further comprise markings disposed on outer surfaces of the first, second, and third sides, the markings configured to delineate length measurements along a length of each arm, and wherein the markings are configured to provide length measurements measured from the interior corner in each of the x-, y-, and z-directions. In some embodiments, the measuring device is configured to fit over the corner of a rectangular item, and wherein an exterior corner of the item mates with the interior corner of the measuring device. In some embodiments, each arm further comprises a length extending from the interior corner of the measuring device to an end of each arm, and wherein the length of each arm is the same. In some embodiments, the length of each arm is 4 inches. In some embodiments, each arm further comprises a high contrast marking at each end of each arm.

In another aspect, a measuring system includes a dimensional measuring device configured to fit over an exterior corner of an item and provide reference measurements in three orthogonal directions, a camera configured to take an image of the item with the dimensional measuring device on the item, and a hardware processor connected to the camera configured to receive the image from the camera and determine the dimensions of the item based on the image and the reference measurements of the dimensional measuring device. In some embodiments, the measuring system further includes a scale that measures a weight of the item, wherein the scale is connected to the processor, and wherein the software receives the measured weight of the item.

In some embodiments, the measuring system further includes a user terminal connected to the processor, and the user terminal includes a display, at least one of a keyboard, mouse, or touchscreen, and wherein the user terminal is configured to display the determined size and measured weight of the item to the user and to allow the user to enter or adjust further shipping parameters.

In some embodiments of the measuring system, the shipping parameters include at least one of destination, source, priority classification, mode of transportation classification, price, weight, and size. In some embodiments, the camera comprises at least a first camera and a second camera held in a fixed relationship to each other by a first camera support and a second camera support. In some embodiments, the first camera is positioned to take an image of a top surface of the item and the second camera is positioned to take an image of a side surface of the item.

In another aspect a method of measuring an item includes placing a dimensional measuring device on an exterior corner of the item, the dimensional measuring device configured to provide reference measurements in three orthogonal directions, taking an image of the item with the dimensional measuring device installed thereon, processing the image to determine a size of the item by comparing the apparent size of the dimensional measuring device in the image with the apparent size of the item in the image.

In some embodiments, comparing the apparent size of the dimensional measuring device in the image with the apparent size of the item in the image includes determining the apparent length in pixels of the dimensional measuring device along each of the three orthogonal directions, determining the apparent length in pixels of the item along each of the three orthogonal directions, and for each of the three orthogonal directions, multiplying the ratio of the apparent length of the item in pixels to the apparent length of the dimensional measuring device by the known reference measurement of the dimensional measuring device to determine a dimension of the item.

In some embodiments determining the apparent length in pixels of the dimensional measuring device along each of the three orthogonal directions includes identifying a center point of the dimensional measuring device in the image, identifying an end point in the image of the dimensional measuring device along each of the three orthogonal directions, and determining the length in pixels between the center point and each of the end points of the dimensional measuring device along each of the three orthogonal directions.

In some embodiments, determining the apparent length in pixels of the item along each of the three orthogonal directions includes identifying a center point of the dimensional measuring device in the image, identifying an end point in the image of an edge of the item along each of the three orthogonal directions, and determining the length in pixels between the center point and each of the end points of the item along each of the three orthogonal directions.

In some embodiments, the method, further includes placing the item on a scale to measure a weight of the item, determining a dimensional weight rating for the item using the determined size and the measured weight of the item, and/or using the dimensional weight rating to determine further shipping parameters, wherein the shipping parameters include at least one of destination, source, priority classification, mode of transportation classification, price, weight, and size.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout.

The features, aspects and advantages of the present disclosure will now be described with reference to the drawings of several embodiments that are intended to be within the scope of the development herein disclosed. These and other embodiments will become readily apparent to those skilled in the art from the following detailed description of the embodiments having reference to the attached figures, the disclosure not being limited to any particular embodiment(s) herein disclosed.

Figure 1A:
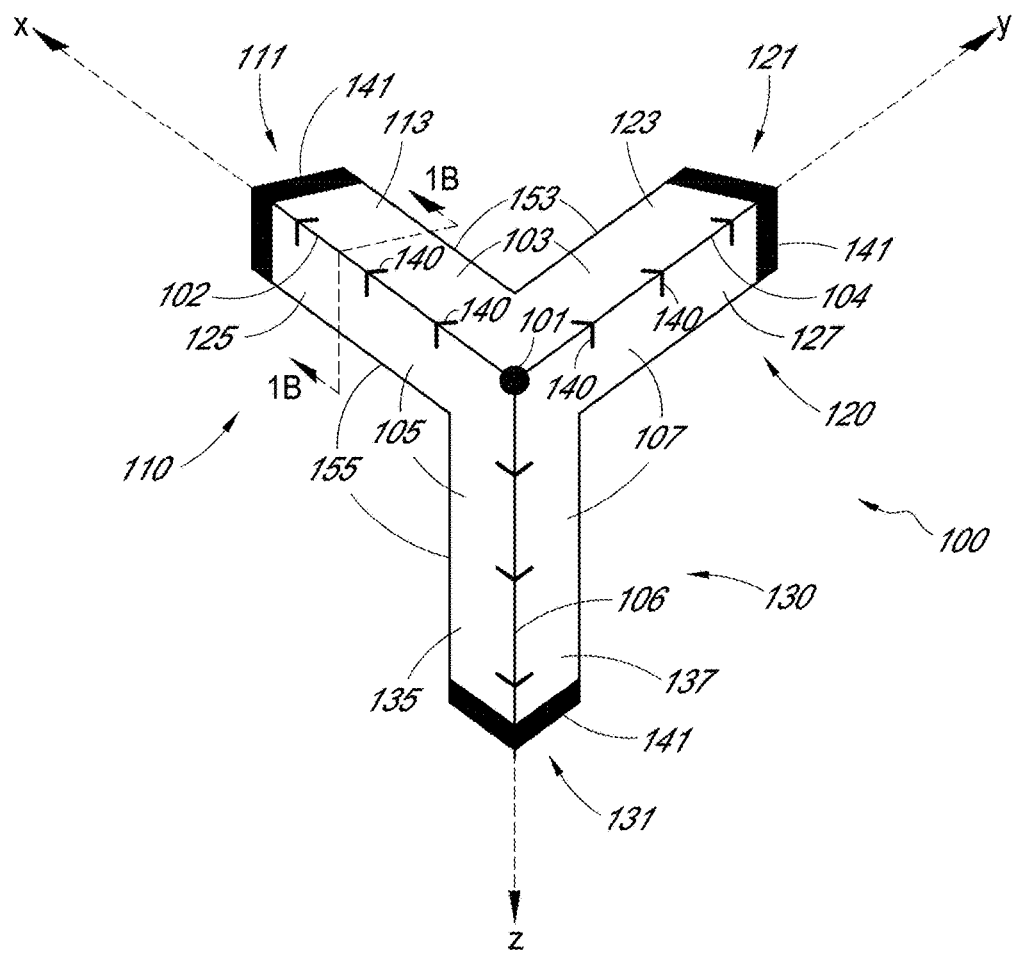
FIG. 1A depicts a perspective view of one embodiment of a three-dimensional measuring device.

FIG. 1A depicts a perspective view of one embodiment of a three-dimensional measuring device 100. The measuring device 100 includes a first side 103, a second side 105, and a third side 107. Each of the first, second, and third sides 103, 105, 107 is joined to each of the other sides at right angles. For example, as depicted, the first side 103 is connected to the second side 105 at a first edge 102 at a 90° angle. The first side 103 is also connected to the third side 107 at a second edge 104 at a 90° angle. The second side 105 and the third side 107 are also connected along a third edge 106 at a 90° angle. In some embodiments, angles greater than or less than 90° can be used. A side may refer to a surface of the measuring device 100. For example, in the illustrated embodiment, the first side 103 is a surface extending in the x-y plane.

In the illustrated embodiment, the shape of each of the first, second, and third sides 103, 105, 107 is substantially L-shaped, although other shapes can be used. For example, the first side 103 includes a first portion 113 extending substantially along the x-axis and a second portion 123 extending substantially along the y-axis. In the illustrated embodiment of FIG. 1A, the first portion 113 is defined on one side by the first edge 102 and the second portion 123 is defined on one side by the second edge 104. The first and the second edges 102, 104 extend in the x-direction and y-direction, respectively, and accordingly, define a 90° boundary on the first side 103, although other shapes are possible. In the illustrated embodiment, the first side 103 extends substantially in the x-y plane from the 90° boundary defined by the first and the second edges 102, 104 towards a first inside edge 153. In the embodiment shown, inside edge 153 also includes a 90° angle, although, this need not be the case in all embodiments. For example, the first inside edge 153 may extend diagonally between the end points of the first portion 113 and the second portion 123, forming the first side 103 in the shape of a triangle. In other embodiments, the first inside edge 153 includes one or more curved portions.

Similarly, the second side 105 may be substantially L-shaped, including a first portion 125 extending substantially along the x-axis and a second portion 135 extending substantially along the z-axis. In the illustrated embodiment, the first portion 125 is defined on one side first by the first edge 102 and the second portion 135 is defined on one side by the third edge 106. The first and third edges 102, 106 extend in the x-direction and z-direction, respectively, and accordingly, define a 90° boundary on the second side 105, although other shapes are possible. In the illustrated embodiment, the second side 105 extends substantially in the x-z plane from the 90° boundary defined by the first and third edges 102, 106 towards a second inside edge 155. In the embodiment shown, the second inside edge 155 includes a 90° angle, although this need not be the case in all embodiments. For example, the second inside edge 155 may extend diagonally between the end points of the first portion 125 and the second portion 135, thus forming the second side 105 in the shape of a triangle. In other embodiments, the inside edge 155 includes one or more curved portions.

The third side 107 is may also be substantially L-shaped, including a first portion 127 extending substantially along the y-axis and a second portion 137 extending substantially along the z-axis. In the illustrated embodiment, the first portion 127 is defined on one side first by the second edge 104 and the second portion 137 is defined on one side by the third edge 106. Second and third edges 104, 106 extend in the y-direction and z-direction, respectively, and accordingly, define a 90° boundary on the second side 105, although other shapes are possible. In the illustrated embodiment, the second side 105 extends substantially in the y-z plane from the 90° boundary defined by the second and third edges 104, 106 towards a third inside edge 157. In the embodiment shown, the third inside edge 157 also includes a 90° angle, although this need not be the case in all embodiments. For example, the third inside edge 157 may extend diagonally between the end points of the first portion 127 and the second portion 137, forming the third side 107 in the shape of a triangle. In other embodiments, the third inside edge 157 includes one or more curved portions.

In some embodiments, the shape of the first, second, and third sides 103, 105, 107 may be the same. For example, as shown in FIG. 1A, each of the first through third sides 103, 105, 107 is formed in the same L-shape. In some embodiments, the first, second, and third sides 103, 105, 107 may each comprise a unique shape. In some embodiments, however, each of the first through third sides 103, 105, 107 includes at least an outer edge formed at a 90° angle, and each of the first through third sides 103, 105, 107 is joined to each of the other sides at a 90° angle.

The first portion 113 of the first side 103 and the first portion 125 of the second side 103 may be joined at a 90° angle to form a first arm 110 of the measuring device 100, the first arm 110 extending in, for example, the x-direction. The second portion 123 of the first side 103 and the first portion 127 of the third side 107 may be similarly joined at a 90° angle to form a second arm 120 extending in, for example, the y-direction. The second portion 135 of the second side 103 and the second side 137 of the third side 107 may be similarly joined at a 90° angle to form a third arm 130 extending in, for example, the z-direction.

In some embodiments, each of the first, second, and third arms 110, 120, 130 of the measuring device 100 extend between a central point 101 of the measuring device 100 and respective ends 111, 121, 131. In some embodiments, the first, second, and third arms 110, 120, 130 each include one or more gradation marks 140, positioned along the length of each arm and configured to represent distances along each of the first through third arms, 110, 120, 130. In some embodiments, the gradation marks 140 indicate distance in imperial units and may include markings indicating the distance from center point 101 in inches or fractions of inches. In some embodiments, the gradation marks 140 indicate distance from center point 101 in metric units and may include markings, for example, in centimeters, millimeters, or fractions of either. In some embodiments, the gradation marks 140 may include markings indicating distance in both imperial and metric units. In some embodiments, measuring device 100 may include no gradation marks 140. In some embodiments, the ends 111, 121, 131 of the first, second, and third arms 110, 120, 130 are also indicated with markings 141. The central point 101 may also be indicated with a marking.

The gradation marks 140 and/or the markings 141 may be designed to include a high contrast from the general body of the measuring device 100 in order to make them easily visible to a human eye or an imaging system. High contrast may be achieved in different ways in various embodiments of measuring device 100. For example, high contrast is achieved by use of highly contrasting colors. For example, the measuring device 100 could be black while the markings could be white. In other embodiments, the measuring device 100 is white and the markings are black. In other embodiments, other combinations of high contrast color pairs are used.

In some embodiments, the gradation marks 140 and/or the markings 141 achieve high contrast with the body of the measuring device 100 by incorporating a reflecting material. For example, the body of the measuring device 100 may be formed from a light absorbing material, for example a flat black material, and the markings may be formed from a reflective material, for example, mirror or glass. In other embodiments, the gradation marks 140 and/or the markings 141 are formed from a material that emits light, for example a phosphorescent or chemi-luminescent material or coating. In some embodiments, the gradation marks 140 and/or markings 141 markings are indicated with electric lights, for example LEDs.

In some embodiments, the gradation marks 140 and/or the markings 141 are painted or applied to the surface of measuring device 100. In other embodiments, the gradation marks 140 and/or the markings 141 are formed as indentations or protrusions extending into or away from the surface of the measuring device 100.

In some embodiments, the gradation marks 140 and/or the markings 141 further include numbering or written description indicating the distance and units that they represent.

Each of the first, second, and third arms 110, 120, 130 of the measuring device 100 extends along an axis away from the central point 101 of the measuring device 100 for a specified length. For example, as shown in FIG. 1, each of the first, second, and third arms 110, 120, 130 extend for a length of four inches. However, it will be appreciated by one of skill in the art that the length of each arm may be varied in different embodiments. For example, each of the first, second, and third arms 110, 120, 130 may comprise a different length; for example, the first, second, and third arms 110, 120, 130 may be 1 inch, 2 inches, 3 inches, 4 inches, 5 inches, 6 inches, 7 inches, 8 inches, or longer. Further, in some embodiments, each of the first, second, and third arms 110, 120, 130 may comprise a different length; for example, the first arm 110 may be 2 inches long, the second arm 120 may be 2.5 inches long, and the third arm 130 may be 4 inches long.

Figure 1B:
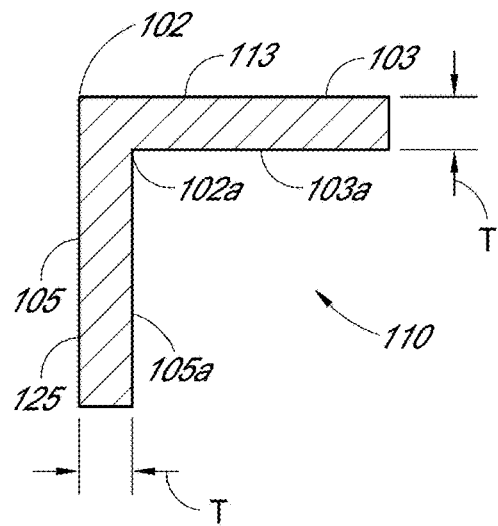
FIG. 1B depicts a cross-sectional view of the three-dimensional measuring device taken along line 1B-1B shown in FIG. 1A.

FIG. 1B depicts a cross-sectional view of the first arm 110 taken along the line 1B-1B shown in FIG. 1A. While the description of FIG. 1B specifically identifies the first arm 110, it will be understood that this discussion is applicable to any of the first, second, and third arms 110, 120, 130. As shown in in FIG. 1B, the cross-section of the first arm 110 is substantially L-shaped. As described above, in the illustrated embodiment, the first portion 113 of the first side 103 and the first portion 125 of the second side 105 are joined at the first edge 102 at a substantially 90° angle. Similarly, an inner surface 103a of the first side 103 and an inner surface 105a of the second side 105 are joined at a first inner edge 102a at a substantially 90° angle. The first side 103 and the second side 105 each comprise a thickness T, as shown. In some embodiments, the thickness T is less than 0.5 inches, less than 0.25 inches, or less than 0.1 inches. In some embodiments, the thickness T of each of the first, second, and third sides 103, 105, 107 may be a different.

Figure 2:
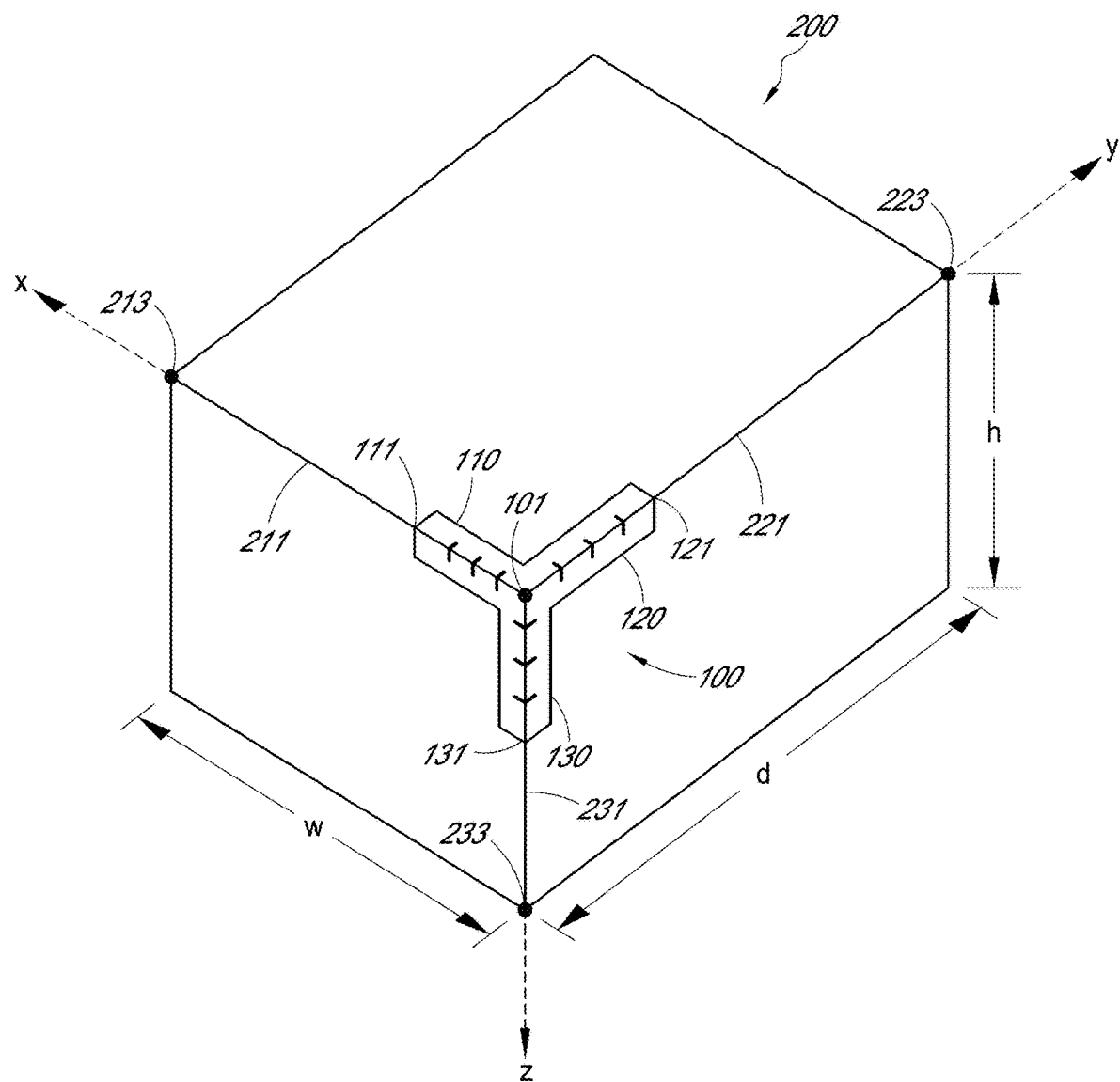
FIG. 2 is a perspective view illustrating the placement of an embodiment of a three-dimensional measuring device on the corner of an item.

The cross-sectional view of the first arm 110 (which, as noted above, is representative of cross-sectional views of the second and third arms 120, 130) may be configured to fit over and rest on top of a corner of a generally square or rectangular item, such as a box or package (for example, as shown in FIG. 2). The measuring device 100 can be placed on an item so that the inner edge 102a comes into contact with the outer edge of a box. When positioned on an item, the inner surfaces 103a, 105a may each contact a side surface of an item.

FIG. 2 depicts an example of the placement of an embodiment of a dimensional measuring device 100 on the corner of an item 200. In the illustrated embodiment, the item 200 is a box, although other items are possible. The embodiment of the measuring device 100, shown in FIG. 2 may include the features described above in reference to FIGS. 1A and 1B. For example, the measuring device 100 includes the first arm 110 extending in the x-direction, the second arm 120 extending in the y-direction, and the third arm 130 extending in the z-direction. Accordingly, in the illustrated embodiment, each of the first, second, and third arms 110, 120, 130 extends orthogonally to the other two arms.

As illustrated, the item 200 is generally shaped as a rectangular prism of height h, width w, and depth d. Each side of the item 200 may be substantially flat and oriented at 90° angles to each adjoining side. The measuring device 100 as illustrated in FIG. 1A may be used to determine the size of any item that has a rectangular prism shape. In this description, however, it may be helpful to describe the item 200 as a traditional cardboard box as is commonly used to package and for distribution and delivery. It will be appreciated that the measuring device 100 can be modified for use with items of other shapes, by for example, adjusting the angles between arms, or otherwise modifying the measuring device 100 to fit an outer portion of the item. Thus, while the following description focuses on an item 200, this disclosure is not limited to that shape.

The measuring device 100 may be configured so that it can be placed on an exterior corner of the item 200. The measuring device 100 may be positioned so that the central point 101 is positioned above or on an exterior corner of the box and each of the first, second, and third arms 110, 120, 130 rests on an edge 211, 221, 231 of the item 200 extending from the exterior corner of the item 200.

When the measuring device 100 is positioned on the corner of the item 200 as shown in FIG. 2, it may be used to determine the approximate height, width, and depth of (or measure) the item 200. In some embodiments, which will be discussed in greater detail below, the measuring device 100 can be used with an optical measuring system to determine the substantially exact size of the box. Because the length of each of the first, second, and third arms 110, 120, 130 of the measuring device 100 is known (or indicated by markings on the measuring device 100), the measuring device 100 provides a reference measurement in the three orthogonal directions corresponding to the height h, width w, and depth d of the item 200. The reference measurement can be used to visually estimate the total length of each side of the item 200.

For example, as shown in FIG. 2, the length of each of the first, second, and third arms 110, 120, 130 may be four inches as indicated by the gradation marks on the measuring device 100. The first arm 110 may be used to estimate the width w of item 200 as follows. In this example, it is known that the distance between the central point 101 and the end point 111 of the first arm 110 is four inches. A visual estimate of the length of the edge 211, which corresponds to the width w of the item 200 may be made by comparing to the length of the first arm 110. For example, it appears that the edge 211 is approximately three times as long as the first arm 110. Accordingly, the length of the edge 211 and width w of item 200 may be estimated to be 12 inches (three times the length of the first arm 110). Similarly, the second arm 120 may be used to estimate the depth d of item 200. A visual estimate of the length of edge 231, which corresponds to the depth d of the item 200 may be made by comparing to the length of the second arm 120. For example, it appears that the edge 221 is approximately three and a half times as long as the second arm 120. Accordingly, the length of edge 221 and depth d of the item 200 may be estimated to be approximately 14 inches. Finally, the third arm 130 may be used to estimate the height h of the item 200. An estimate of the length of the edge 231, which corresponds to the height h of the item 200 may be made by comparing to the length of the third arm 130. For example, it appears that the edge 231 is twice as long as the third arm 130. Accordingly, the length of the edge 231 and height h of the item 200 may be estimated to be approximately 8 inches. Accordingly, the dimensions of the item 200, in this example, may be estimated to be 12 inches by 14 inches by 8 inches.

The preceding description is provided by way of example only to illustrate how the measuring device 100 may be used to estimate the size of the item 200. The measuring device 100 can be configured in different sizes to provide different references measurements for different shaped objects. Also, the orientation of the measuring device 100 on the item 200 can be varied. For example, the first arm 110 can extend in the z-direction, the second arm 120 can extend in the x-direction, and the third arm 130 can extend in the y-direction.

It is noted that, in some embodiments, the measuring device 100 only provides an estimate of the size of item 200 if the lengths of the sides of the item 200 exceed the length of each of the first, second, and third arms 110, 120, 130 of the measuring device 100. In some embodiments, however, the measuring device 100 can provide more direct and precise measurements, for example, when used to measure objects that have lengths of sides that are shorter than the lengths of the first, second, and third arms 110, 120, 130 of the measuring device 100. In these embodiments, the gradation marks on measuring device 100 can be compared against the edges of the item 200 to provide a more exact measurement. In some embodiments, the measuring device 100 may be configured to be large, so as to be capable of providing direct measurements of many standard size boxes. For example, each of the first, second, and third arms 110, 120, 130 of the measuring device 100 may be three feet in length (or longer), and accordingly, the measuring device 100 may provide direct measurements of boxes with sides of less than three feet in length (or longer).

In some embodiments, the first, second, and third arms 110, 120, 130 are configured with fixed lengths as described above. In some embodiments, the first, second, and third arms 110, 120, 130 are configured with extendable lengths so that the length of each arm 110, 120, 130 can be adjusted to more accurately measure different size items. For example, each arm 110, 120, 130 may include a rolled, self-retracting tape measure, which can be extended in the direction of each arm to increase the length of the arm. In some embodiments, each arm 110, 120, 130 may include at least two rigid segments (or more) connected with a pin in groove (or other mechanism, such that the rigid segments can be moved relative to each other along their length to extend the overall length of the arm.

In some embodiments, the measuring device 100 is configured to be collapsible for convenient storage. For example, measuring device 100 may include one or more hinges (not shown) connecting the first, second, and third arms 110, 120, 130 to a central point. The one or more hinges may be configured such that the first, second, and third arms 110, 120, 130 are collapsible relative to each other. In some embodiments, each of the first, second, and third arms 110, 120, and 130 may have a hinge disposed along a centerline of the first, second, and/or third arms 110, 120, 130, which allows the particular arm to fold in half. Referring to first arm 110, the lengthwise hinge is operable to bring the first portion 113 into contact with the second portion 125 of the first arm 110. The one or more hinges may allow the measuring device 100 to have a first configuration where each of first, second, and third arms 110, 120, 130 are oriented orthogonally to the other two arms, as described above, and a second configuration where the first, second, and third arms 110, 120, 130 are collapsed and each extend in the same direction.

In some embodiments, one or more of the first, second, and third arms 110, 120, 130 may be configured with a moveable joint, such as one or more ball-and-socket joints, (not shown) at central point 101, such that the relative angle between the pivoting arm and the other arms may be adjusted. In these embodiments, the first, second, and third arms 110, 120, and 130, are connected at a single point to the moveable joint at the central point 101. Thus, the first, second, and third arms 110, 120, and 130 can be moved or adjusted to provide multi-dimensional measurements of irregularly shaped packages, for example, triangular prisms or pyramids. In some embodiments, the measuring device 100 may include a protractor so that the relative angle between the arms can be measured as it is adjusted.

As previously noted, the principles described above may be modified to produce a measuring device 100 that is capable of measuring other three-dimensional shapes beyond rectangular prisms. For example, the measuring device 100 can be configured with three arms oriented at an angle less than or equal to 90°, for example, 30°, 45°, or 60° degrees, relative to each other so as to provide a multi-dimensional measuring device for a three-sided pyramid. Similarly, the measuring device 100 may include four arms oriented at an angle less than or equal than 90° relative to each adjacent arm so as to provide a multidimensional measuring device for a four-sided pyramid. These embodiments are described by way of example only, and one of skill in the art will understand that various other configurations are possible to measure various other three-dimensional shapes.

The measuring device 100 may be manufactured in discrete parts that are assembled or as a single unitary part by any suitable process, including, but not limited to, injection molding, casting, machining, die-casting, pressing or forming, vacuum-forming, or 3D printing. In some embodiments, the measuring device 100 is made from plastic, rubber, metal, wood, or any other suitable material.

In some embodiments, the measuring device 100 may be made from paper. In some embodiments, the measuring device 100 can be formed as a three-dimensional shape folded from a flat piece of paper. For example, a flat template for measuring device 100 can be provided in a single piece of paper which can be cut out by any suitable means; the cutout can then be folded into shape, and the shape may be held in place by adhesive, for example tape or glue. In these embodiments, the template for the measuring device 100 may be substantially T-shaped or X-shaped. These embodiments may allow a user to print the template from the internet using a conventional home-printer and assemble the measuring device 100 at home. In some embodiments, the assembled measuring device 100 may be affixed to a package with tape or other adhesives, for later use by a delivery service. Such later use may include scanning the package, for example, by taking an optical image thereof, and computing the size of the package automatically as will be described in greater detail below. In some embodiments of the printed measuring device 100, the printout may contain additional information that will be useful to the delivery service, for example, names, addresses, bar codes, pricing information, etc.

Figure 3A:
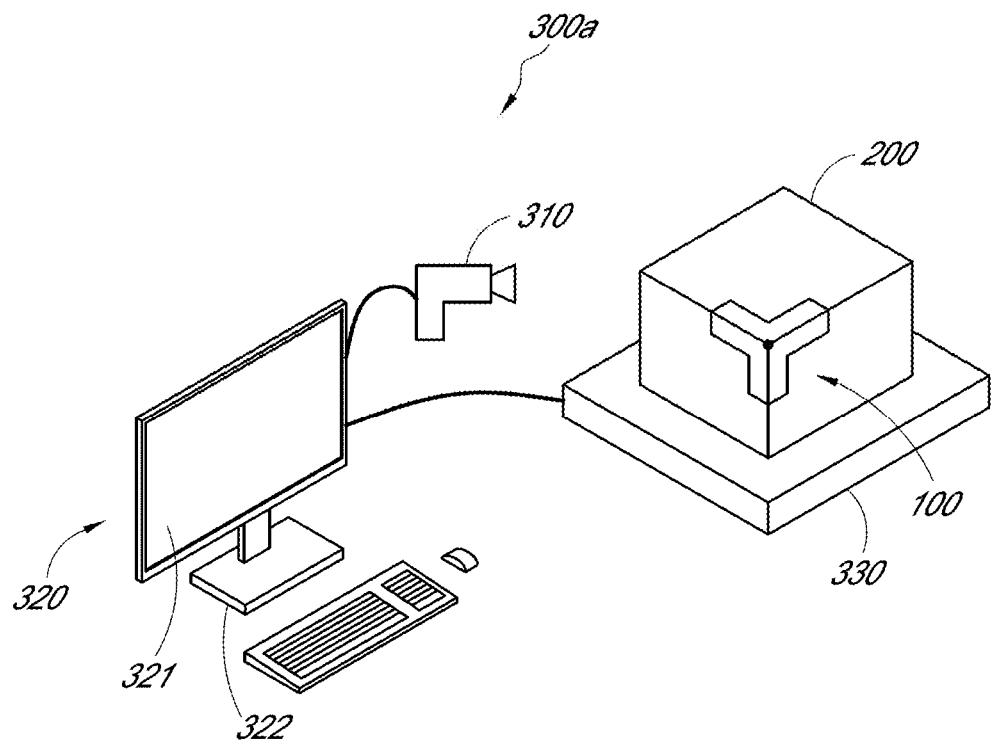
FIG. 3A is a perspective view of an embodiment of an optical measuring system including a three-dimensional measuring device.

FIG. 3A depicts an embodiment of an optical measuring system 300a that makes use of a three-dimensional measuring device 100. The measuring system 300a may include the measuring device 100, configured as above to be placed on a corner of the item 200, a camera 310, a processing device 320, and a scale 330, among other things.

In some embodiments of the measuring system 300a, the measuring device 100 is configured similar to that described above with reference to FIGS. 1A through 2. In some embodiments, an image of the item 200 with the measuring device 100 placed thereon is taken and analyzed to determine the size of item 200.

The measuring system 300a includes a camera 310 connected to a processing device 320. The term "camera" is used herein to denote any type of image capture device capable of capturing an image, for example, a digital camera or cell phone camera. In some embodiments, the camera 310 may include a two-dimensional array of image pixel sensors (not shown). The image pixel sensors may be a charge-coupled device (CCD), complementary metal-oxide-semiconductor (CMOS), or the like. In some embodiments, the camera 310 may include a display to allow a user to frame, preview, and review a captured image.

The camera 310 may be handheld so that a user may easily orient the camera 310 relative to the item 200 and the measuring device 100 to take the image. In some handheld embodiments, the camera 310 is a stand-alone device. In some embodiments, the camera 310 may be integrated into another handheld device. For example, the measuring systems 300a may be deployed and integrated with other package processing systems that include handheld scanners configured to read labels affixed to packages, for example bar or QR code scanners. In some embodiments, the camera 310 may be a camera which is part of a user's smartphone, tablet, laptop, or computer, provided that the user's device contains an image capture device.

Figure 3B:
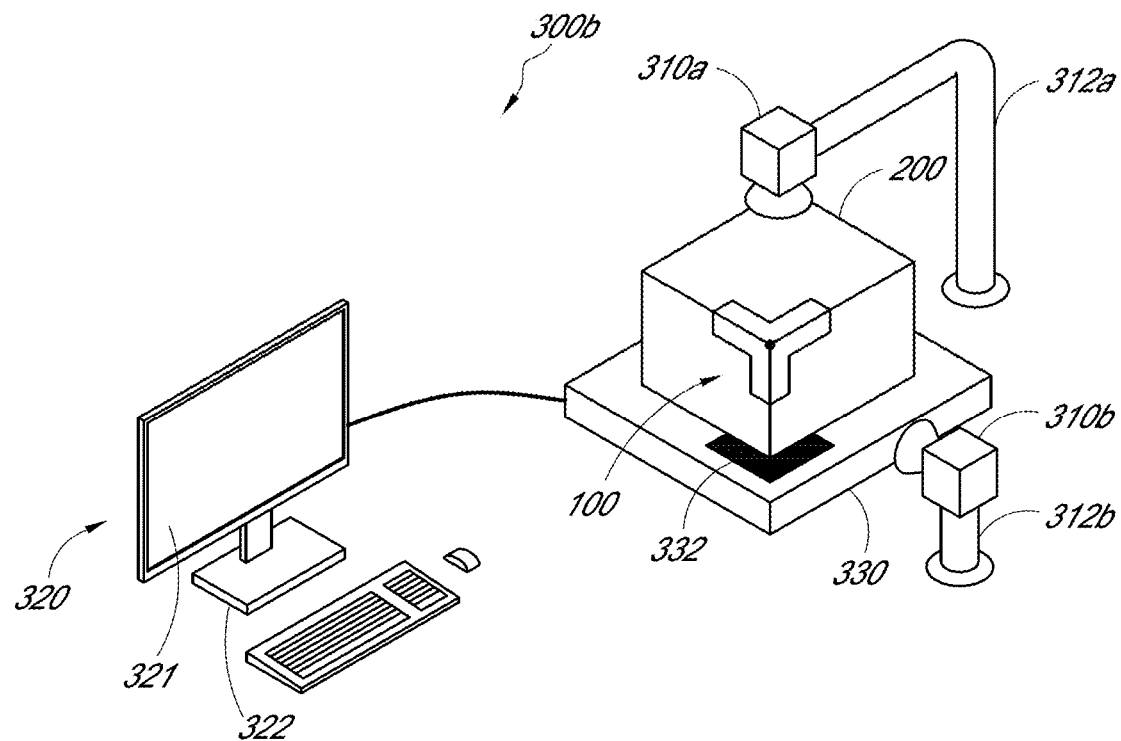
FIG. 3B is a perspective view of another embodiment of an optical measuring system.

FIG. 3B shows another embodiment of a measuring system 300b. In some embodiments, the camera 310a may be rigidly attached to a camera support 312a. The measuring station may include a platform upon which the item 200 with the measuring device 100 positioned thereon is placed. The camera 310a can be rigidly mounted relative to the platform so as to capture an image of the item 200 placed on the platform. In some embodiments, the camera 310a is rigidly mounted above or to the side of the platform. In some embodiments, the camera 310a is mounted so that the captured image contains views of three sides of the item 200. This may be accomplished, for example, by rigidly attaching the camera 310 in a position so that it views the platform at a downward angle of, for example, approximately 45°. In some embodiments, the camera is mounted so that the captured image contains views of at least two sides of the item 200. In some embodiments, multiple cameras 310a, 310b may be used to ensure that images containing at least two sides of the item 200 are captured. As shown in FIG. 3B, for example, a first camera 310a can be provided positioned above the item 200 to capture a top view of the box and a second camera 310b can be provided to capture a side view of the item 200. The top and side views of the box will show all three dimensions of the item 200. In some embodiments, more than three cameras 310 may be used, for example, to capture images of three or more sides of the item 200. One of skill in the art will appreciate that other multi- or single-camera arrangements are possible and within the scope of the present disclosure. In some embodiments, measuring system 300b may include a positioning guide 332 that is used to position the item 200 relative to the mounded cameras 310a, 310b. A user may place the item 200 on the platform in a specified orientation relative to the positioning guide 332.

Each measuring system 300a, 300b may include a scale 330 connected to the processing device 320. The scale 330 can be configured to measure the weight of the item 200 placed thereon. In some embodiments, the scale 330 is configured so that item 200 with measuring device 100 may be placed thereon. In some embodiments, the scale 330 is calibrated to automatically subtract the weight of the measuring device 100, so that the measured weight reflects the weight of the item 200 alone.

As noted above, the camera 310 and the scale 330 are connected to a processing device 320. In some embodiments, the connection may be a wired connection, for example as shown in FIG. 3A. In some embodiments, the connection may be wireless, for example, using any wireless communication protocol, including Wi-Fi, Bluetooth, or the like. In some embodiments, the wired or wireless connection between the camera 310, the scale 330, and the processing device 320 can be direct, with no intervening devices. Although, in some embodiments, the connection can be indirect. For example, the camera 310 and/or the scale 330 may be wirelessly connected to a router that may then connect the camera 310 and/or the scale 330 to the processing device 320 via a local area network (LAN) or wide area network (WAN). In some embodiments, where the camera 310 is a camera in a smartphone, tablet, or laptop computer, or the like, the processing device 320 can be an application running on the smartphone, tablet or laptop computer, or other processing device, which receives images from the camera 310, and may process the images using the application, or may communicate data indicative of the images to another processing device 320 via a wired or wireless communication method. The processing device 320 can be a remotely located server.

The processing device 320 may be configured to receive an image (or images) of the item 200 with measuring device 100 installed thereon from the camera 310 and determine the dimensions of the item 200 therefrom. This image processing method will be described in greater detail below. In some embodiments, the processing device 320 also receives the measured weight of item 200 from the scale and may also be configured to determine a density of the item 200.

The processing device 320 may include a central processing unit (CPU) or processor. The processing device 320 may perform logical and arithmetic operations based on program instructions stored within a memory. The memory may include both read-only memory (ROM) and random access memory (RAM) and may be configured to provide instructions and data to the processor. A portion of the memory may also include non-volatile random access memory (NVRAM). The instructions in the memory may be executable to implement the methods described herein.

The processor of processing device 320 may include one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing device 320 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing device 320 to perform the various functions and methods described herein.

The processing device 320 may be configured to process the image or images captured by the one or more cameras 310 to determine the dimensions of the item 200 to be measured by comparing the image of the item 200 to the known dimensions of the measuring device 100.

The processing device 320 may further include a communication module that may include communication circuitry to allow transmission and reception of data between the processing device 320 and a device external to the processing device 320. The communication module may be configured to send and receive data to or from the processing device 320 via a network, for example to a database or another computer system.

In some embodiments, the processing device 320 may be a general-purpose computer connected to a display 321 and one or more input devices 322. The display 321 may be configured to display instructions regarding the use of the measuring system 300a, 300b and to display the determined dimensions of the item 200. The input device 322 may include a keyboard, mouse, touchscreen, and/or other input device. The input device 322 may be configured to allow the user to review and edit the determined dimensions of item 200 and to enter and review additional information regarding the item 200.

In some embodiments, the processing device 320 is built into the camera 310. Accordingly, in some embodiments, the camera 310 is configured to both capture an image of the item 200 and process the image to determine the measurements of the item 200.

Figure 4:
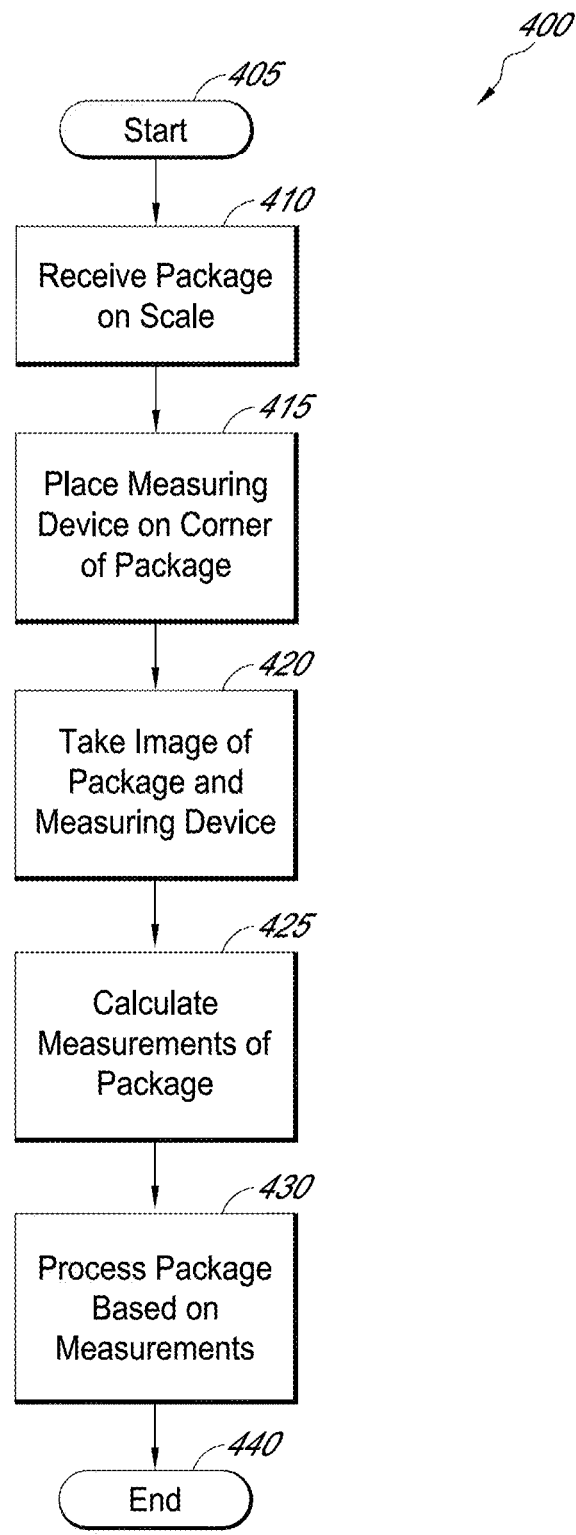
FIG. 4 is a flowchart illustrating an implementation of a method for using an optical measuring system and three-dimensional measuring device as described herein for determining the dimensions of a package.

FIG. 4 is a flowchart illustrating an implementation of a method 400 for determining the dimensions of a package using an optical measuring system, for the example optical measuring system 300a, 300b described in reference to FIGS. 3A and 3B.

The method 400 begins at block 405 with a package (or other type of item as described above) whose dimensions are to be determined. In some embodiments, the package is a rectangular cardboard box to be sent through a distribution network, such as the mail. At block 410, the package is received on a scale 330. As described in reference to FIG. 3, the scale 330 is configured to measure the weight of the package and transmit the measured weight to a processing device 320. At block 415, a three-dimensional measuring device 100 is placed on a corner of the package, for example, as shown in FIGS. 2 and 3. In some embodiments, the three-dimensional measuring device 100 is configured to provide a known reference measurement in each of three orthogonal directions along three edges representing the width, depth, and height of the package.

At block 420, an image is taken of the package with the measuring device 100 installed thereon using a camera 310. In some embodiments, the image is taken with a single camera 310. When only a single image is taken, the image may include a full view of the measuring device 100 and each of the three sides of the package that form the corner on which the measuring device 100 is placed. In some embodiments, the image may include only two sides of the package. In some embodiments, multiple images may be taken using a single camera 310 or multiple cameras 310. When multiple images are taken, at least one image may show at least each full side of the package that forms the corner on which the measuring device 100 is placed. For example, a first image may show a top view of the package, a second images may show a side view of the package, and a third image may shows a front view of a box. In another embodiment, two images may be used, showing two adjoining sides of the package.

In some embodiments, the multiple images of the package with the measuring device 100 installed thereon are taken from several different perspectives. Each different image may be independently processed and the results can be compared with those obtained from processing the other images as a quality check procedure.

At block 425, the image or images are processed on the processing device 320 to determine the dimensions of the package based upon the known reference measurements of the measuring device 100. For example, in some embodiments, the apparent size of the measuring device 100 (in other words, the apparent length of each of the arms of the measuring device) in the image or images can be compared with the apparent length of the corresponding edges of the package in the image. In some embodiments, the apparent lengths are determined in units of pixels in the images. In some embodiments, perspective effects are accounted for when determining the apparent lengths. In some embodiments, for each of the three orthogonal directions corresponding to the height, width, and depth of the package, the dimensions of the package are determined by multiplying the ratio of the apparent length of the package to the apparent length of the dimensional measuring device by the known reference measurement of the dimensional measuring device to determine the dimensions of the package. This process will be described more fully below in reference to FIG. 5.

At block 430, the package may be processed based on the measured weight and determined dimensions. Processing the package may involve different steps depending on where and how the specific implementation of the optical measuring system is deployed. For example, the optical measuring system 300a may be deployed as part of a distribution network for shipping packages through the mail. Accordingly, the package may be routed or handled differently depending on the size and weight of the package. In some embodiments, a dimensional weight rating may be determined for the package. The dimensional weight rating may be used to further process the item. In some embodiments, the dimensional weight rating is determined based on the size and/or weight of the package. The dimensional weight rating may be used to determine handling or routing instructions, pricing, or other information. Processing a package in a distribution network will be described more fully below in reference to FIG. 6. The method 400 ends at block 440. In some embodiments, measurement and/or weight information can be sent to other computing systems on the distribution network. For example, the measurement and/or weight information can be sent to a cost calculator that determines a rate based on the size and weight of the package. As another example, the measurement and/or weight information can be used to provide handling instructions for the package.

Figure 5:
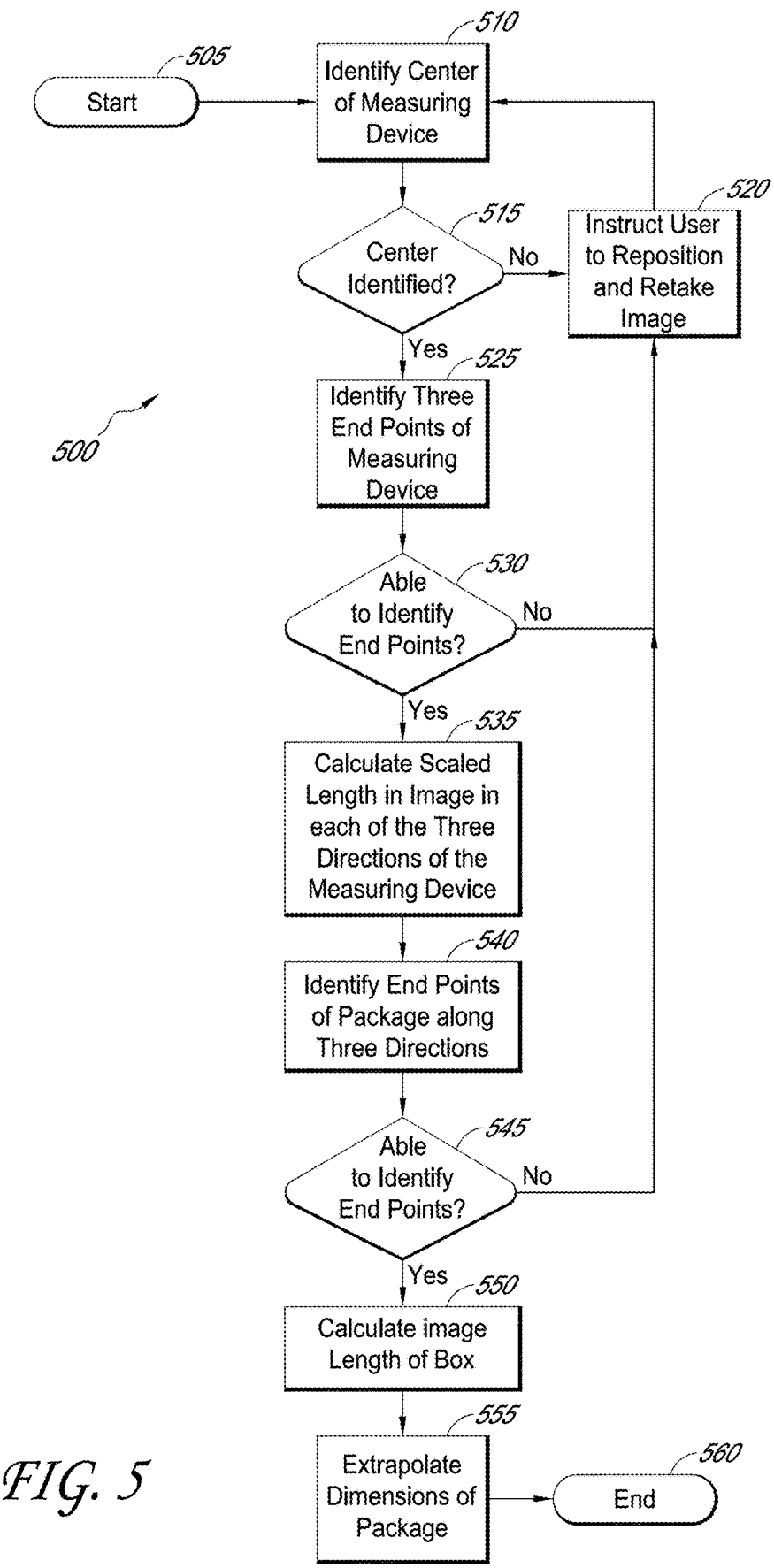
FIG. 5 is a flowchart illustrating an implementation of a method for processing an image to determine the dimensions of a package.

FIG. 5 is a flowchart illustrating an implementation of a method 500 for processing an image or images, for example, the image or images taken using the camera 310 of optical measuring system 300a, to determine the dimensions of a package. For purposes of clarity, the following description is made in reference to processing a single image. A person of skill in the art, however, will understand that these principles may be adjusted, without departing from the scope of this disclosure, for application to the processing of multiple images. In some embodiments, the method 500 is implemented in software on the processing device 320.

The method 500 begins at block 505. In some embodiments, the method 500 is used to determine the measurements of a package at block 425 of the method 400 of FIG. 4. Accordingly, start block 505 may be preceded by block 420 of method 400, where an image of a package with the measuring device 100 installed thereon is taken. At block 505, the method 500 begins with the image being transferred to a processor of the processing device 320.

At block 510, the location in the image representing the central point 101 of the measuring device 100 is determined. In some embodiments, the processing device 320 is configured to recognize the central point 101 by scanning or analyzing the image for the central point 101. The central point 101 may be a specific high contrast or patterned marking representing on the measuring device 100.

From block 510, the method 500 moves to decision state 515, wherein it is determined whether the processing device 320 was able to identify the central point 101 of the measuring device 100. If the processing device 320 is unable to identify the central point 101, the method moves to block 520, wherein the processing device 320 instructs a user to reposition the package and the measuring device 100 and to retake the image. In some embodiments, the processing unit 320 may be unable to identify the central point 101 of the measuring device 100 because the image did not capture the package and the measuring device 100 in the correct orientation. In some embodiments, poor lighting or other factors may prevent detection of the central point 101.

In some embodiments, at block 520, the processing unit 320 may analyze the image to determine the reason for the error. For example, the processing unit 320 may analyze the image to determine whether the measuring device 100 or a package to be measured are present in the image at all. In some embodiments, the processing unit 320 may analyze the image to determine whether poor lighting or an image obstruction (for example, other packages or items) prevented the detection of the central point 101. In some embodiments, the processing unit 320 provides specific instructions to the user regarding retaking the image, the specific instructions dependent upon the analysis of the image. In other embodiments, however, the instructions may be generic or omitted.

Returning to decision state 515, if the central point 101 of measuring device 100 is recognized within the image, method 500 proceeds to block to 525, wherein the processing unit 320 analyzes the image to determine the locations of the three respective end points 111, 121, 131 of the measuring device 100 within the image. In some embodiments, this analysis begins by analyzing the portion of the image surrounding the identified central point 101 to identify the first, second, and third edges 102, 104, 106 of measuring device 100. Once the edges 102, 104, 106 are identified, processing unit 320 scans the image beginning at the identified central point 101 along directions corresponding to the identified edges until the markings 141 at the respective end points 111, 121, 131 are identified. In some embodiments, the processing unit 320 is configured to scan the image for the high contrast or patterned markings 141 associated with end points 111, 121, 131.

In some embodiments, the steps of method 500 described in reference to blocks 510 and 525 may be performed simultaneously. For example, the processing unit 320 may be configured to scan the image for a distinctive shape or pattern of the entire measuring device 100, and may accordingly identify both the central point 101 and each endpoint 111, 121, 131 at the same time. In these embodiments, the decision states 515 and 530 may also be performed simultaneously. In some embodiments, the processing unit 320 may be configured to scan the image to identify the edges 102, 104, 106 of measuring device 100, and thus, may identify the central point 101 and end points 111, 121, 131 as the starting and ending points of each edge.

At decision state 530, the processing unit 320 determines whether it was able to identify each end point 111, 121, 131 of measuring device 100. If one or more of the end points 111, 121, 131 were not identified, the method moves to block 520, where, as described above, the user is instructed to reposition the package and the measuring device 100 and retake the image. As above, in some embodiments, the user may be provided with specific instructions regarding why the end points 111, 121, 131 were not identified. For example, if the processing unit 320 was able to identify only two end points, the user may be provided with instructions indicating that the image should be retaken to contain a full view of all three arms 110, 120, 130 of the measuring device 100.

Returning to the decision state 530, if all three endpoints 111, 121, 131 are not identified in the image, the method moves to block 520 and proceeds as discussed above. If all the endpoints 111, 121, 131 are identified in the image, the processing unit 320 may determine a scaled length in the image of each arm 110, 120, 130 of the measuring device 100. For example, the processing unit 320 can determine an apparent length, measured in, for example, pixels, extending between the central point 101 and each of the three endpoints 111, 121, 131. The apparent length can represent how long a dimension appears in the image. The processing unit 320 may then compare the determined apparent length of each arm 110, 120, 130 to the known reference measurement length of each arm 110, 120, 130 to establish the scaled length in each of the three orthogonal directions of the measuring device 100. For example, if the determined apparent length between central point 101 and end point 111 is determined to be 500 pixels and the known length of the first arm 110 is 4 inches, the processing unit 320 can establish a scaled length in the x-direction, wherein each 500 pixel length along the x-direction represents 4 inches. Similarly, scaled lengths can be established in the y- and z-directions corresponding to the second and third arms 120, 130, respectively. In some embodiments, the scaled length along each of the x-, y-, and z-directions will not be the same.

At block 540, the processing unit 320 identifies the end point (for example, a corner) of the package along each of the x-, y-, and z-directions. In some embodiments, the processing unit 320 is configured to begin by scanning or analyzing the portions of the image just beyond the identified end points 111, 121, 131 to recognize the edges of the package. The image may be scanned along each edge to identify the corners of the package.

At decision state 545, the method 500 determines whether the processing unit 320 was able to identify the three end points of the package along the x-, y-, and z-directions. If the end points were not identified, the method proceeds to block 520, where the user is instructed to reposition the package and measuring device 100 and retake the image, as described above. If the end points were identified, the method 500 moves to block 550. At block 550, the processing unit 320 determines the apparent length in, for example, pixels, of the edges of the packages along the x-, y-, and z-directions. In some embodiments, this is accomplished by determining the pixel length between the identified central point 101 and each of the identified end points of the package in the image.

At block 555, the method 500 extrapolates the scaled length, determined at block 535, to determine the actual lengths of the package in the x-, y-, and z-directions, each of these lengths corresponding to one of the actual width w, depth d, and height h of the package. In some embodiments, the processing unit 320 extrapolates the scaled length by dividing the image length in pixels of an edge of the item by the image length in pixels of a corresponding arm of the measuring device 100 and multiplying by the known reference measurement length of the arm of the measuring device 100. For example, if the scaled length along the x-direction was determined to be 500 pixels representing 4 inches and the determined image length of the package along the x-direction was 2250 pixels, the processing unit will determine the actual length of the package of the item along x-direction to be 18 inches. The actual lengths of the package along the y- and z-directions can be similarly extrapolated.

In some embodiments, for each of the three orthogonal directions corresponding to the height, width, and depth of the package, the dimensions of the package are determined by multiplying the ratio of the apparent length of the package to the apparent length of the dimensional measuring device by the known reference measurement of the dimensional measuring device to determine the dimensions of the package. In some embodiments, the processor is configured to take into perspective effects into account when establishing a scaled length. In some embodiments, no scale length is established, and the dimensions of the package are determined directly.

Method 500 ends at block 560. In some embodiments, the determined measurements of the item are used to further process the item as described at block 430 of method 400 in FIG. 4.

Figure 6:
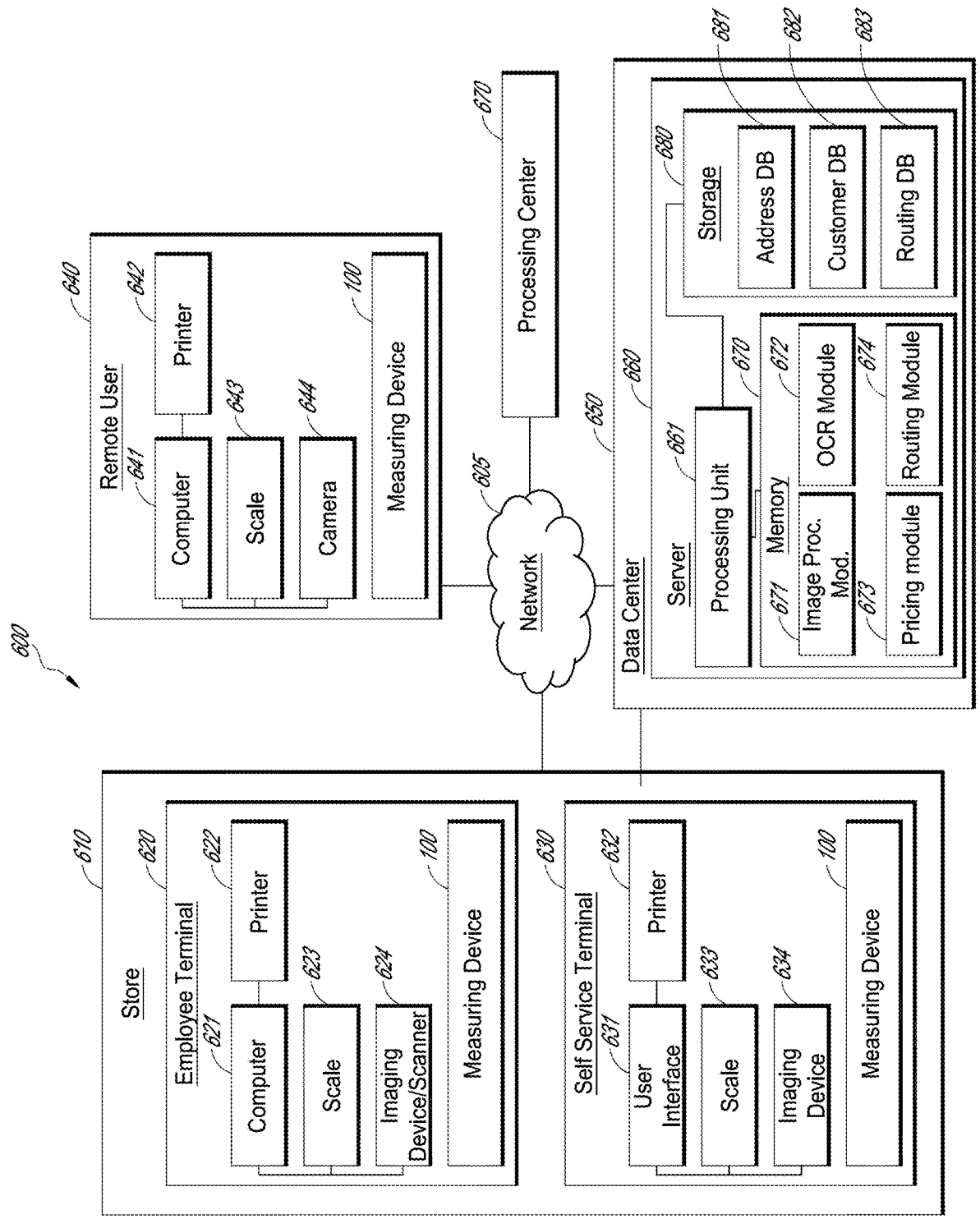
FIG. 6 depicts a functional block diagram of an embodiment of an optical measuring system integrated into a distribution network.

FIG. 6 depicts a functional block diagram of embodiments of optical measuring systems integrated into a distribution network 600. The distribution network 600 may provide the infrastructure to allow a user to process and ship items. As used herein, the term "user" may refer to a person, such as an individual, a corporation, an organization, a computer system or network adapted to interact with the distribution network 600, or any other desired entity capable of interfacing with the distribution network 600. The user may be an employee or customer of the distribution network 600. The term "item" includes letters, flats, postcards, parcels, cards, periodicals, correspondence, packages, and any other items or item types that are handled and distributed in or by the distribution network 600. Also as used herein, the term item may refer to items processed by a delivery network, such as mail, letters, postcards, parcels, or may refer to any item in any distribution network 600 such as items in a warehouse, a logistics network, airport baggage handling networks, or any other type of distribution network. The United States Postal Service (USPS) is an exemplary embodiment of the distribution network 600 described herein, although the present disclosure is not limited thereto.

The efficiency of the distribution network 600 may be improved when the dimensions and weight of the items to be shipped can be accurately and quickly obtained. For example, the cost of shipping an item with the distribution network 600 may be related to the size and/or weight of the item to be shipped. Or, the efficiency of the distribution network 600 can be improved when the size and/or weight of the items to be shipped are used to organize and arrange the individual items within a particular shipment, for example, within a truck or other transport. Embodiments of the optical measuring systems 300a, 300b as described above, can be incorporated into the distribution network 600 to improve its efficiency. Other uses and advantages are also possible. Further, not every advantage or use specified herein are necessary in all embodiments.

As shown in FIG. 6, the distribution network 600 may include one or more storefronts 610, one or more remote users 640, one or more data centers 650, and one or more processing centers 670 connected via a network 605. The network 605 may allow communication of the various parts of the distribution network 600 over one or more private networks or over a public network such as the internet.

In some embodiments, the storefront 610 may be a brick and mortar institution, such as, for example, a post office. The storefront 610 may include one or more employee terminals 620 and/or one or more self-service terminals 630. An employee terminal 620 may include a computer 621 connected to a printer 622, a scale 623, and an integrated scanner/imaging device 624. The employee terminal 620 may also include a measuring device 100. The computer 621 may include a display and one or more input devices, for example, a keyboard and/or mouse. The computer 621 may allow the employee to enter, review, and modify shipment information regarding particular items to be shipped. The integrated scanner/imaging device 624 may include a barcode or QR code scanner and a digital camera imaging device. The employee terminal 630 may allow an employee of the distribution network 600 to receive an item to be shipped and process the item into the distribution network 600. The employee can place the package to be shipped on the scale 623, place the measuring device 100 on the package, and take an image of the package with the integrated scanner/imaging device 624. The image may then be analyzed by the computer 621 or sent to the data center 650, so that the dimensions of the package can be determined using the methods described above.

A self-service terminal 630 may include a user interface 631, a printer 632, a scale 633, an imaging device 634, and a measuring device 100. The self-service terminal 630 may be configured to allow a customer of the distribution network 600 to deposit and process his or her own package for shipment. The user interface 631 may be provided on a display and accompanied by an input device such that the customer can interact with the user interface 631. The user interface 631 may provide the customer with instructions for processing the package. For example, the user interface 631 may provide the user with instructions to place the package to be shipped on the scale 633, place the measuring device 100 on the package, and take an image of the package with the imaging device 634. The image may then be analyzed by the self-service terminal 630 or sent to the data center 650, so that the dimensions of the package can be determined using the methods described above. In some embodiments, the self-service terminal 630 is not located at the storefront 610.

The distribution network 600 may also include one or more remote users 640. A remote user 640 may be a customer of the distribution network 600 located in his or her home and having a package to be shipped. The remote user 640 may have a computer 641 connected to one or more of a printer 642, a scale 643, and/or a camera 644. In some embodiments, the camera 640 may be the remote user's cell phone camera, tablet camera, or other digital camera. In some embodiments, the computer 640 may the also be the remote user's cell phone or tablet. In some embodiments, the computer 640 may be a personal computer, such as a desktop or laptop computer. The remote user 640 may also have a measuring device 100. In some embodiments, the remote user may have purchased the measuring device 100 from the distribution network 600 at a storefront 610, or, the remote user may have requested a measuring device 100 from the distribution network 600 over the network 605 and had the measuring device 100 delivered to the remote user 640. In some embodiments, the remote user may have printed a paper version of the measuring device 100 which the user downloaded, purchased, or otherwise obtained from the distribution network or related entity. In some embodiments, the remote user may be provided with instructions via the computer 641. The remote user 640 may be instructed to place the package to be shipped on the scale 643, place the measuring device 100 on the package, and take an image of the package with the camera 644. The image may then be analyzed by the computer 641 or sent to the data center 650, so that the dimensions of the package can be determined using the methods described above. In some embodiments, the remote user 640 may be located at a retail establishment.

The distribution network 600 may also include one or more data centers 650. A data center 650 may include one or more servers 660. The data center 650 with one or more servers 660 may provide the processing power for the distribution network 600. A server 660 may include a processing unit 661 connected to a memory unit 670 and a storage unit 680. The processing unit 661 may be a central processing unit (CPU) or processor. The processing unit 661 may perform logical and arithmetic operations based on program instructions stored within the memory unit 670.

The memory unit 670 may include both read-only memory (ROM) and random access memory (RAM) and may be configured to provide instructions and data to the processing unit 661. A portion of the memory may also include non-volatile random access memory (NVRAM). The memory unit 670 may include one or more modules configured to provide instructions to the processing unit 661. The memory unit 670 may include an image-processing module 671, an optical character recognition (OCR) module 672, a pricing module 673, and a routing module 674. The image-processing module 671 may be configured to provide instructions to the processing unit 661 for processing images of packages with measuring devices 100 installed thereon to determine the dimension of the packages using the methods described above. The OCR module 672 may be configured to provide instructions to the processing unit 661 for processing images and extracting text therefrom, using methods known in the art. The pricing module 673 may be configured to provide the processing unit 661 with instructions for determining the price required to ship a certain item. The routing module 674 may be configured to provide instructions to the processing unit 661 for determining routing information between a given origin and destination address. In some embodiments, one or more of the above-identified modules may be omitted or combined with another module. Other modules may also be included. The modules may be implanted in software, hardware, or a combination thereof.

The server 660 may also include a storage unit 680 connected to the processing unit 661. The storage unit 680 may include one or more hard disk drives, solid-state drives, or other electronic storage devices for storing one or more databases. For example, the storage unit 680 may include an address database 681, a customer database 682, and a routing database 683. The address database 681 may store the addresses to which the distribution network can ship. The customer database 682 may store information regarding the customers of the distribution network. The customer information can include customer names, customer addresses, past customer shipment information, customer payment information, and the like. The routing database 683 may include information related to various shipment routes within the distribution network 600. In some embodiments, one or more of the databases described above may be omitted or combined with one or more of the other databases. Other databases may also be included.

The distribution network 600 can also include one or more processing centers 670. A processing center 670 may be facility that physically processes and distributes items to be shipped within the distribution network. For example, a processing center 670 may receive the items to be shipped and divide them into various trucks or other transports for shipment.

The distribution network 600, with integrated optical measuring systems, as shown in FIG. 6, can be used to efficiently process items for shipment. For example, a customer may bring a package to be shipped to an employee at an employee terminal 620 at the storefront 610. The package may include an origin and a destination written on the package. The employee may place the package on the scale 623 and the dimensional measuring device 100 on the package. The employee may then use the integrated scanner/imaging device 624 to take an image of the package with the measuring device 100 installed thereon.

The computer 621 may transmit the image to a server 660 in the data center 650. The processing unit 661 of the server 660 may access the instructions stored in the image-processing module 671 to determine the dimensions of the package using the method described above, in reference to FIG. 5. The processing unit 661 may also access the OCR module 673 to extract the hand written source and destination addresses from the handwriting written on the package. The processing unit 661 may then access the pricing modules 673 and routing module 673 as well as information in the databases of the storage unit 680 to determine pricing and routing information for the package based on dimensions, destination, and/or type of package. Once complete, this information can be stored in the databases in the storage unit 680 and/or transmitted back to the computer 621 of the employee terminal 620. The employee may verify the information, obtain payment from the customer, and, using the printer 622, print a shipping label to be applied to the package. The label may include one or more bar or QR codes. The label may also include specific handling instructions based on the size and weight of the package. The package may then be transferred to the processing center 670. The processing center 670 may scan the bar or QR codes on the package and route the package to its destination.

In another example, a remote user 640 may have a package to ship at his or her home. In some embodiments, the remote user 640 may notify the distribution network of a package to be shipped via a website using the computer 641 or via an application on a cell phone or tablet. The website or application can instruct the remote user 640 to take an image of the package with the measuring device 100 installed thereon. The remote user 640 can take the image using the camera 644, for example, the camera on his or her cell phone. The remote user 640 can then upload the image to the data center 650. The data center 650 can process the image as described above. The remote user 640 may then pay for shipment via the website or application. The remote user 640 may then drop off the package at a storefront 610 or other location for shipment, or, an employee of the distribution network 600 may come and pick up the package.

The distribution network 600, including the optical measuring systems described herein, may quickly and accurately measure the size of items to be shipped by the distribution network 600. The distribution network 600 can then use the sizing information to efficiently ship the items.

It is to be recognized that depending on the embodiment, certain acts or events of any of the methods described herein can be performed in a different sequence, may be added, merged, or left out altogether. Not all described acts or events are necessary for the practice of the method. Moreover, in certain embodiments, acts or events may be performed concurrently, for example, through multi-threaded processing, interrupt processing, or multiple processors, rather than sequentially.

Although above steps of the above processes have been described a particular order, the steps are not limited to performance in the order indicated. It will be understood by a person of skill in the art, guided by the teachings herein, that the steps of the processes described herein may be performed in one or more orders, as desired. A person of skill in the art will further recognize than the above-outlined steps can be performed in any desired order, and can include sub-steps or sub-processes.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the disclosure as applied to various embodiments, it will be understood that various omissions, substitutions, and changes in the form and details of the device or process illustrated may be made by those skilled in the art without departing from the spirit of the disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C #), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this disclosure be limited to the specific embodiments disclosed herein, but that it cover all modifications and alternatives coming within the true scope and spirit of the disclosure as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A measurement system comprising:
   a measurement device formed from a printable medium, the measurement device having first, second, and third arms each extending outward from a central point, the measurement device configured to be placed on a corner of an item with the first, second, and third arms extending along different edges of the item;
   one or more processors configured to:
   receive, from a user device, an image of the item having the measurement device disposed thereon;
   determine, from the image of the item, dimensions of the item;
   determine, based on the determined dimensions, a cost for sending the item through a distribution network;
   generate a printable label having a computer readable code thereon; and
   transmit the printable label to the user device.

2. The measurement system of claim 1, wherein the one or more processors are further configured to determine, from the image of the item, an intended destination for the item.

3. The measurement system of claim 1, wherein the printable medium comprises paper.

4. The measurement system of claim 1, wherein the one or more processors are further configured to receive one or more item characteristics from the user device.

5. The measurement system of claim 1, wherein the item characteristics include one or more of: a weight of the item, an intended destination of the item, a class of service for the item, and a sender identifier.

6. The measurement system of claim 1, wherein the one or more processors are further configured to receive a payment of the cost of sending the item.

7. A method for measuring an item for sending in a distribution network comprising:
   transmitting, to a sender's device, a printable image of a measurement device having first, second, and third arms each extending outward from a central point, the measurement device being configured to be placed on a corner of an item with the first, second, and third arms extending along different edges of the item;
   receiving, from the sender's device, an image of an item having the measurement device placed thereon, with the first, second, and third arms each extending along different edges of the item;
   determining, in a processor, dimensions of the item based the image of the item having the measurement device placed thereon;
   generating, in a processor, an electronic label having a computer readable code thereon; and
   transmitting the electronic label to the sender's device in a printable format.

8. The method of claim 7, further comprising:
   receiving, from the sender's device, an intended destination for the item;
   determining, based on the determined dimensions and the intended destination, a cost for sending the item in a distribution network; and
   receiving, from the sender's device, a payment corresponding to the determined cost.

9. The method of claim 7, further comprising:
   determining, from the received image, an intended destination for the item;
   determining, based on the determined dimensions and the intended destination, a cost for sending the item in a distribution network; and
   receiving, from the sender's device, a payment corresponding to the determined cost.

10. The method of claim 7, further comprising:
    receiving, in a facility of the distribution network, the item having thereon a physical version of the transmitted electronic label;
    scanning the computer readable code on the physical label;

determining, based on the scanned computer readable code, whether payment has been received for sending the item; and routing the item based on the determination whether payment has been received.

11. A system for measuring an item, the system comprising:
- a measuring device configured to be placed on an item, the measuring device comprising:
  - a first arm extending in a first direction and configured to provide a first reference measurement in the first direction;
  - a second arm extending in a second direction and configured to provide a second reference measurement in the second direction;
  - a third arm extending in a third direction and configured to provide a third reference measurement in the third direction;
- a camera configured to capture a first image of the item with the measuring device on the item; and
- a processor in communication with the camera and configured to:
  - receive the first image from the camera;
  - analyze the first image to make a first determination whether the first arm of the measuring device is present in the first image; and
  - based on the first determination, provide a request to a user to capture a second image of the item with the measuring device on the item.

12. The system of claim 11, wherein the processor is further configured to:
- analyze the first image to make a second determination whether the second arm of the measuring device is present in the first image; and
- based on the second determination, provide the request to the user to capture the second image of the item with the measuring device on the item.

13. The system of claim 12, wherein the processor is further configured to,
- analyze the first image to make a third determination whether the third arm of the measuring device is present in the first image;
- based on the third determination, provide the request to the user to capture the second image of the item with the measuring device on the item.

14. The system of claim 13, wherein the processor is further configured to:
- analyze the second image to determine whether each of the first arm, the second arm, and the third arm of the measuring device are present in the second image; and
- upon determination that each of the first arm, the second arm, and the third arm of the measuring device are present in the second image, determine the dimensions of the item based on the second image and the reference measurements of the measuring device.

15. The system of claim 14, wherein the processor is configured to determine the dimensions of the item based on the first image and the second image.

16. The system of claim 11, wherein the measuring device is configured to fit over and rest on an exterior portion of the item such that the first arm extends along a first edge of the item in the first direction, the second arm extends along a second edge of the item in the second direction, and the third arm extends along a third edge of the item in the third direction.

17. The system of claim 16, wherein the processor is further configured to:
- analyze the first image to determine whether a first endpoint of the first edge of the item is present in the first image; and
- based on the determination, provide the request to the user to capture the second image of the item.

18. The system of claim 17, wherein the processor is further configured to:
- analyze the first image to determine whether a second endpoint of the second edge of the item is present in the first image; and
- based on the determination, provide the request to the user to capture the second image of the item.

19. The system of claim 18, wherein the processor is further configured to:
- analyze the first image to determine whether a third endpoint of the third edge of the item is present in the first image; and
- based on the determination, provide the request to the user to capture the second image of the item.

20. The system of claim 19, wherein the processor is further configured to:
- analyze the second image to determine whether each of the first arm, the second arm, and the third arm of the measuring device and each of the first end point, the second end point, and the third endpoint of the item are present in the second image; and
- upon determination that each of the first arm, the second arm, and the third arm of the measuring device and each of the first end point, the second end point, and the third endpoint of the item are present in the second image, determine the dimensions of the item based on the second image and the reference measurements of the measuring device.

* * * * *